United States Patent
Dakshinkar et al.

(10) Patent No.: US 11,979,826 B2
(45) Date of Patent: May 7, 2024

(54) SELECTION OF A TRANSMITTING VAP FOR A MBSSID SET

(71) Applicant: Hewlett Packard Enterprise Development LP, Houston, TX (US)

(72) Inventors: Abhiruchi Dakshinkar, Santa Clara, CA (US); Xuguang Jia, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 233 days.

(21) Appl. No.: 17/488,837

(22) Filed: Sep. 29, 2021

(65) Prior Publication Data
US 2023/0095205 A1 Mar. 30, 2023

(51) Int. Cl.
*H04W 4/00* (2018.01)
*H04W 48/10* (2009.01)
*H04W 48/20* (2009.01)
*H04W 72/542* (2023.01)
*H04W 72/56* (2023.01)

(52) U.S. Cl.
CPC ........... *H04W 48/20* (2013.01); *H04W 48/10* (2013.01); *H04W 72/542* (2023.01); *H04W 72/56* (2023.01)

(58) Field of Classification Search
CPC ... H04W 48/20; H04W 48/10; H04W 72/542; H04W 72/56; H04W 48/12; H04W 84/12
USPC ......................................................... 370/338
See application file for complete search history.

(56) References Cited

U.S. PATENT DOCUMENTS

| | | | |
|---|---|---|---|
| 9,332,497 B2 | 5/2016 | Bhanage et al. | |
| 9,653,138 B1 * | 5/2017 | Hashimoto | ......... G11C 11/1675 |
| 10,009,280 B2 | 6/2018 | Weitzman et al. | |
| 10,433,191 B2 | 7/2019 | Thubert et al. | |
| 2015/0006737 A1 * | 1/2015 | Chen | ..................... H04L 5/0044 709/226 |
| 2018/0288695 A1 | 10/2018 | Tchigevsky et al. | |
| 2018/0302923 A1 * | 10/2018 | Patil | .................... H04W 74/008 |
| 2019/0208462 A1 | 7/2019 | Patil et al. | |
| 2019/0215884 A1 | 7/2019 | Paul et al. | |
| 2019/0268825 A1 | 8/2019 | Patil et al. | |
| 2020/0015181 A1 | 1/2020 | Patil et al. | |
| 2020/0245212 A1 | 7/2020 | Jia et al. | |
| 2020/0359259 A1 | 11/2020 | Patil et al. | |
| 2022/0400374 A1 * | 12/2022 | Hazarika | ................ H04W 48/12 |
| 2023/0067513 A1 * | 3/2023 | Khoury | ................. H04W 48/08 |

(Continued)

*Primary Examiner* — Chuong T Ho
(74) *Attorney, Agent, or Firm* — Hewlett Packard Enterprise Patent Department

(57) ABSTRACT

Implementations of the present disclosure relate to selecting a transmitting virtual access point (VAP) for a MBSSID set. A method comprises selecting a VAP from a set of VAPs as a transmitting VAP based on context information about the set of VAPs, at least one of the set of VAPs other than the transmitting VAP being determined as at least one non-transmitting VAP The method also comprises generating a beacon frame for the set of VAPs by including an identifier of the transmitting VAP in a header part of the beacon frame and including at least one identifier of the at least one non-transmitting VAP in a payload part of the beacon frame. A generated beacon frame is broadcasted. In this way, a transmitting VAP of a set of VAPs is no longer determined by default, but can be selected for different cases.

18 Claims, 9 Drawing Sheets

(56) References Cited

U.S. PATENT DOCUMENTS

2023/0102644 A1\* 3/2023 Gan ..................... H04W 76/15
　　　　　　　　　　　　　　　　　　　370/328

\* cited by examiner

SELECTION OF A TRANSMITTING VAP FOR A MBSSID SET

BACKGROUND

A set of Virtual Access Points (VAPs) may be created in a physical Access Point (AP), each of the VAPs functioning as an individual "AP". The physical AP may use a single Beacon or Probe Response frame to advertise information for the set of VAPs. In this case, the set of VAPs may be referred to as a Multiple Basic Service Set Identifier (MBSSID) set. According to the Draft 6 version of specification of 802.11ax, MBSSID support is mandatory for such APs operating at 6 GHz and is optional for 2.4 GHz and 5 GHz.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

A MBSSID set typically contains one transmitting (TX) VAP and one or more non-transmitting (non-TX) VAPs. A beacon frame for a MBSSID set can be called as "MBSSID beacon frame" or "MBSSID beacon". An MBSSID beacon is sent by the transmitting VAP of the MBSSID set, and the MBSSID beacon also contains information of the non-transmitting VAPs of the MBSSID set. When an MBSSID beacon is provided, the BSSID of the transmitting VAP may be considered as the BSSID of the MBSSID beacon.

The TX VAP determined in conventional ways may not be suitable for many cases, for example, causing the size of the beacon frame for the MBSSID set to be too big. For example, in a case where the AP is an Enhanced MBSSID Advertisement (EMA) AP, non-TX VAPs can inherit information from the TX VAP in the beacon frame. The size of the beacon frame may be reduced if most of the non-TX VAPs can inherit information from the TX VAP However, this inheritance relationship between the TX VAP and the non-TX VAP is not considered in conventional techniques. Therefore, example implementations of the present disclosure relate to actively selecting a transmitting VAP for a set of VAPs, such that a suitable transmitting VAP can be selected for different cases.

Figure 1:
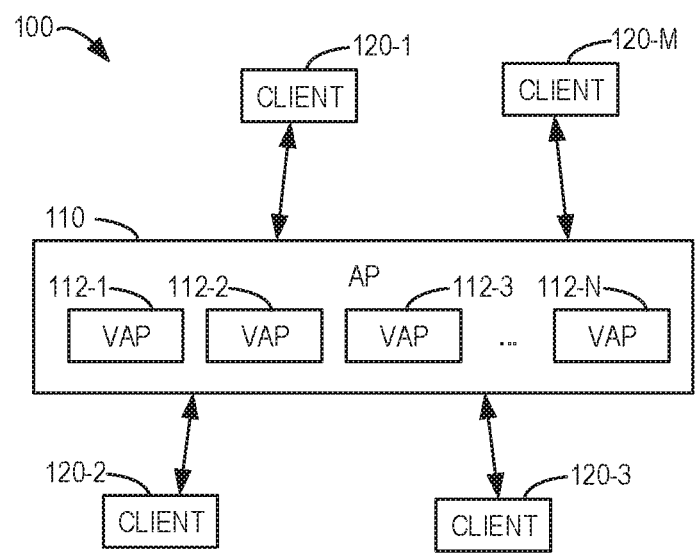
FIG. 1 illustrate a block diagram of an example communication environment in which example implementations of the present disclosure can be implemented.

FIG. 1 illustrates an example environment 100 in which example implementations of the present disclosure can be implemented. The example environment 100 may be implemented as a wireless communication network such as a WLAN. The example environment 100 includes an AP 110 and a set of clients including client 120-1, client 120-2, client 120-3, . . . , and client 120-M, where M is an integer larger than one. For the purpose of discussion, the client 120-1, client 120-2, client 120-3, . . . , and client 120-M may be collectively referred to as "clients 120" or individually referred to as a "client 120".

A client 120 may also be referred to as a user device or station (STA). Examples of client 120 may include, but are not limited to, a cell phone, tablet device, laptop computer or the like. The AP 110 may be any suitable device that allows one or more clients 120 to connect to the wireless communication network in the example environment 100. For example, the AP 110 may be an EMA AP. An EMA AP is a type of AP for the MBSSID set. In the EMA AP, the TX VAP is broadcasted each time the beacon frame is broadcast, but the non-TX VAP may not. The interval for advertising a non-TX VAP is a multiple of profile periodicity indicated in the beacon frame. Thus, the interval for a non-TX VAP may be multiple times of the interval for the TX VAP As used herein, an AP may comprise, be implemented as, or known as a Radio Router, Radio Transceiver, switch, Wi-Fi hotspot device, Basic Service Set (BSS), Extended Service Set (ESS), Radio Base Station (RBS), or some other terminology.

As shown in FIG. 1, the AP 110 may operate as a set of VAPs including VAP 112-1, VAP 112-2, VAP 112-3, . . . , and VAP 112-N, where N is an integer larger than one. The VAP 112-1, VAP 112-2, VAP 112-3, . . . , and VAP 112-N may be collectively referred to as "VAPs 112" or individually referred to as a "VAP 112". The set of VAPs 112 may be referred to as a MBSSID set for the AP 110. The AP 110 may provide communication connections for one or more clients 120 in the example environment 100 through the set of VAPs 112.

It is to be understood that the specific numbers of VAPs and clients in FIG. 1 are only for the purpose of illustration without suggesting any limitations. The example environment 100 may include any suitable number of VAPs and clients configured for implementing implementations of the present disclosure.

Communications in the example environment 100 may operate according to the wireless communication protocols such as Institute of Electrical and Electronic Engineers (IEEE) 802.11 standards, Wi-Fi Alliance Specifications, or any other wireless communication standards. The IEEE 802.11 standards may include the IEEE 802.11ax standard (e.g., operating at 6 GHz), or any other wireless communication standards.

The AP 110 broadcasts a beacon frame for the set of VAPs 112 to the clients 120, instead of broadcasting multiple beacon frames each for one of the set of VAPs 112. A VAP is selected from the set of VAPs 112 as a transmitting VAP in accordance with implementations of the present disclosure. This will be described below with reference to FIG. 2.

Figure 2:
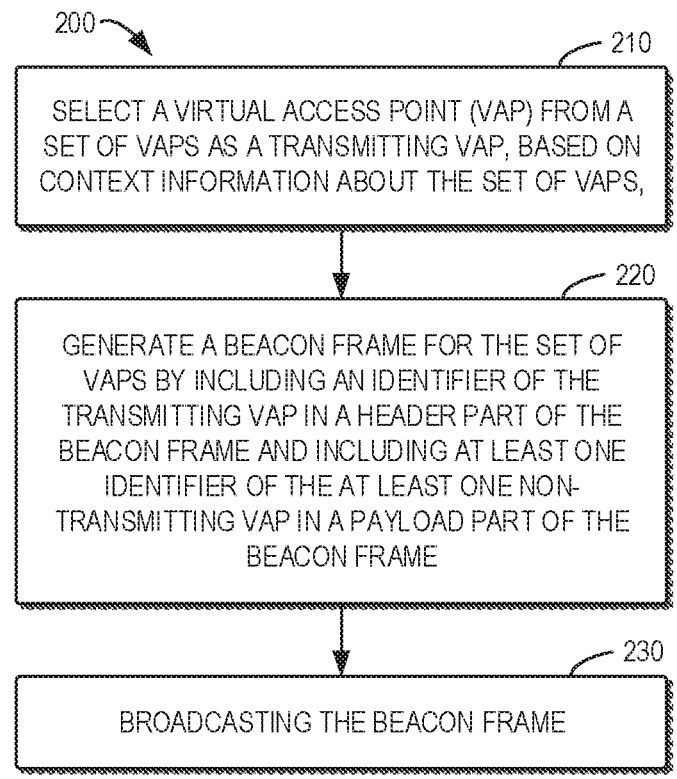
FIG. 2 illustrates a flowchart of a method in accordance with some example implementations of the present disclosure.

FIG. 2 illustrates a flowchart of a method 200 in accordance with some example implementations of the present disclosure. The method 200 can be implemented at an AP with a set of VAPs according to the implementations described herein. For the purpose of discussion, reference is made to FIG. 1 to describe the method 200. It is noted that although only some blocks are shown in the method 200, the method 200 may comprise other operations described herein.

At 210, the AP 110 selects a VAP from a set of VAPs 112 as a transmitting VAP based on context information about the set of VAPs 112. At least one of the set of VAPs 112 other than the transmitting VAP is thus determined as at least one non-transmitting VAP. For example, a VAP 112-1 from the set of VAPs 112 as shown in FIG. 1 may be selected as the transmitting VAP and other VAPs 112 including the VAP 112-2, VAP 112-3, . . . , and VAP 112-N are determined as non-transmitting VAPs. In implementations described herein, the AP 110 is capable of actively assigning a role of transmitting VAP and a role of non-transmitting VAP to the set of VAPs 112 by considering various types of context information about those VAPs 112. The context information may facilitate the AP 110 to select a suitable transmitting VAP for different cases. Some example implementations of such context-based selection of transmitting VAP will be discussed in detail below.

At 220, the AP 110 generates a beacon frame for the set of VAPs 112 by including an identifier of the transmitting VAP and including at least one identifier of at least one non-transmitting VAP in the beacon frame. A beacon frame may include a header part and a payload part. As one of the VAPs 112 is specifically selected as the transmitting VAP the identifier of the transmitting VAP may be included in a header part of the beacon frame. In addition, at least one identifier of at least one non-transmitting VAP may be included in a payload part of the beacon frame.

In some example implementations, a BSSID of the selected transmitting VAP may be included in the header part of the beacon frame, e.g., Media Access Control (MAC) header. In some example implementations, instead of using a BSSID of a non-transmitting VAP as an identifier, an identifier of the non-transmitting VAP in the beacon frame may be determined to be an offset from the BSSID of the transmitting VAP For example, if the BSSID of the transmitting VAP is a MAC address, an identifier of a first non-transmitting VAP may be a BSSID of the MAC address plus one, an identifier of a second non-transmitting VAP may be a BSSID of the MAC address plus two, and so on. Different offsets may be determined for different non-transmitting identifiers. The offsets (e.g., one; two, etc.) may be then included in a payload part of the beacon frame; e.g., in the Multiple BSSID-Index element of the beacon frame according to the specification of 802.11ax. The payload size for the offsets may be reduced as compared with directly including the BSSIDs of the non-transmitting VAPs. At a receiving side of the beacon frame, the identifiers of the non-transmitting VAPs may be calculated from the offsets and the BSSID of the transmitting VAP and then may be determined as the BSSIDs of the non-transmitting VAPs.

With the beacon frame generated, at 230, the AP 110 broadcasts the generated beacon frame to the clients 120. In this way, a transmitting VAP of a set of VAPs is no longer determined by default, but can be dynamically selected for different cases.

In some example implementations, the context information about the VAPs 112 may include information related to the set of VAPs 112 themselves and/or information related to the clients 120 connected to the set of VAPs 112. The selection of the transmitting VAP based on different types of context information in some example implementations will be discussed later with reference to FIGS. 3A-38 and 4A-4D.

In some example implementations, the AP 110 may select a VAP 112 as a transmitting VAP based on context information indicating a size of the beacon frame to be generated. The size of the beacon frame may vary as a different VAP 112 is selected as the transmitting VAP. More specifically, the inheritance relationship between Information Elements (IEs) of the transmitting and non-transmitting VAPs in the beacon frame may cause the size of the beacon frame to vary with different VAPs. This will be discussed below in detail with reference to FIGS. 3A-3B.

Figure 3A:
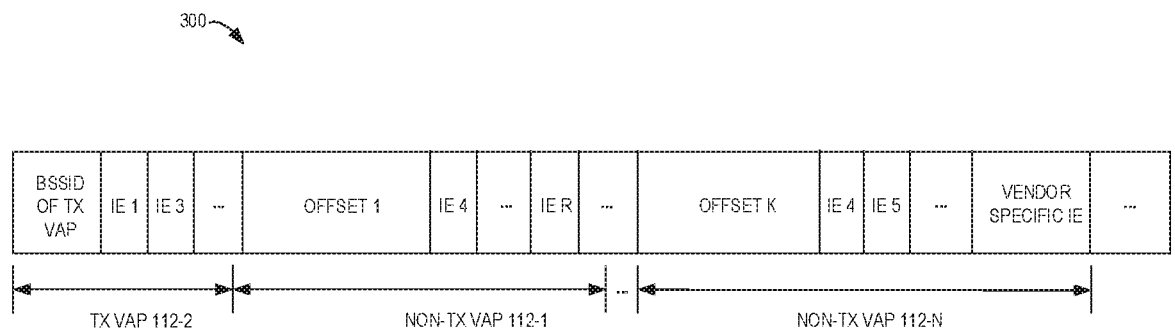
FIGS. 3A-3B illustrate an example beacon frame for a set of VAPs in accordance with some example implementations of the present disclosure.
Figure 3B:
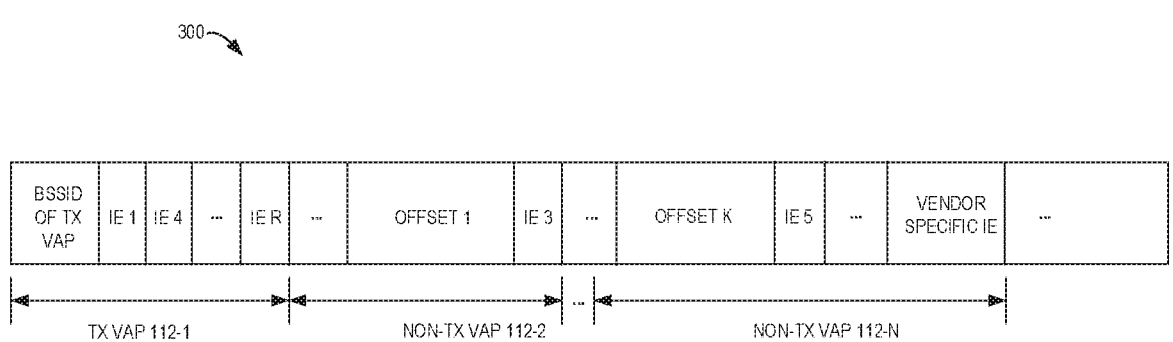

FIGS. 3A-3B illustrates an example beacon frame 300 for a set of VAPs 112 in accordance with some example implementations of the present disclosure. The beacon frame 300 may be generated by an AP 110 as shown in FIG. 1, using the method 200 as described with reference to FIG. 2. While only some elements are shown, the beacon frame 300 may comprise other elements described herein or elements according to the specification of 802.11.

As described above; an identifier (e.g., BSSID) of a selected transmitting VAP and identifiers (e.g., an offset from the BSSID of a transmitting VAP) of non-transmitting VAPs may be included in the beacon frame 300. Other configuration information of the transmitting and non-transmitting VAPs may be included in the beacon frame 300 as Information Elements (IE).

There may be some overlaps among the IEs of the transmitting and non-transmitting VAPs. Moreover, there may be some vendor specific IEs, e.g., in VAP 112-N. Vendor specific IEs may include configuration information specified by the vendor and configuration information defined by users. According to the specification of 802.11ax, IEs of a transmitting VAP in a set of VAPs can be inherited by other non-transmitting VAPs of the set of VAPs, except vendor specific IEs.

For example, a VAP 112-1 has IEs including IE 1, IE 4 and IE R, and VAP 112-2 has IEs including IE 1 and IE 3, and VAP 112-N has IEs including IE 4, 1E 5. If the VAP 112-2 is selected as the transmitting VAP, since the VAP 112-1 can inherit IE 1 from the VAP 112-2, a beacon frame 300 will be generated as shown in FIG. 3A. If the VAP 112-1 is selected as the transmitting VAP since the VAPs 112-2 and 112-N can inherit IE 1 and IE 4 from the VAP 112-1, respectively, a beacon frame 300 will be generated as shown in FIG. 3B. It can be seen that the size of beacon frame 300 in FIG. 3B is smaller than the size of beacon frame 300 in FIG. 3A. This is because VAP 112-1 has more common IEs than VAP 112-2 and VAP 112-N.

It can be seen that by generating the beacon frame 300 as described above, the size of the beacon frame 300 becomes smaller. Thus, a transmitting VAP may be selected considering the size of the beacon frame to be generated.

In some example implementations, in a case of where there are overlaps between IEs of one or more VAP of the set of VAPs, e.g. as shown in FIG. 3B, the VAP having most identical IEs with other IEs can be selected as a transmitting VAP For example, in FIG. 3B, VAP 112-1 has IE 1, IE 4 and 1E R, and VAP 112-2 has IE 1 and IE 3, and VAP 112-N has IE 4 and IE 5. VAP 112-1 may be selected as the transmitting VAP since VAPs 112-2 and 112-N can inherit IE 1 and IE 4 from VAP 112-1, respectively.

In some example implementations, in a case where there are no overlaps between IEs of one or more VAP of the set of VAPs, a VAP having IEs with shorter length than other VAPs may be selected as the transmitting VAP Since a beacon frame for the set of VAPs is broadcasted periodically, and the IEs for the transmitting VAP may also be repeatedly broadcasted in the beacon frame, selecting a VAP with a shorter IE length enables generating a beacon frame with a smaller size, which may allow the communication consumption of the beacon frame reduced.

In some example implementations, in a case of where one or more VAPs of the set of VAPs have vendor specific IEs, a VAP having vendor specific IEs with a shorter length than other VAPs of the one or more VAPs, or a VAP having no vendor specific IEs may be selected as the transmitting VAP As mentioned above, vendor specific IEs of a VAP cannot be inherited by other VAPs, thus due to the same reason explained above, a VAP having vendor specific IEs with shorter length or having no vendor specific IEs may be selected to enable conserving each individual beacon frame in the AP.

The implementations discussed above are only some examples, there may be other cases not discussed herein, for example, a case that there are overlaps between IEs of one or more VAP of the set of VAPs, and one or more VAPs of the set of VAPs have vendor specific IEs. As long as the size of the beacon frame is considered, the scope of the present disclosure is not limited in this regard. According to those implementations, by selecting a suitable VAP as the transmitting VAP, the size of the beacon frame can be reduced.

In some example implementations, the AP 110 may alternatively or additionally select a VAP 112 as a transmitting VAP based on context information indicating respective importance levels of a set of clients 120 connecting to the set of VAPs 112. The importance levels of the set of clients 120 may be compared with each other. In accordance with a determination that an importance level of a client of the set of clients 120 is higher than that of other clients, a VAP 112 to which the client 120 is connected may be selected as the transmitting VAP In some example implementations, the importance level of the client may be referred to as a Service Level Agreement (SLA) requirement of the client. In some other implementations, the importance level of the client may be determined according to various other factors or may be assigned by the users. The scope of the present disclosure is not limited in this regard.

Figure 4A:
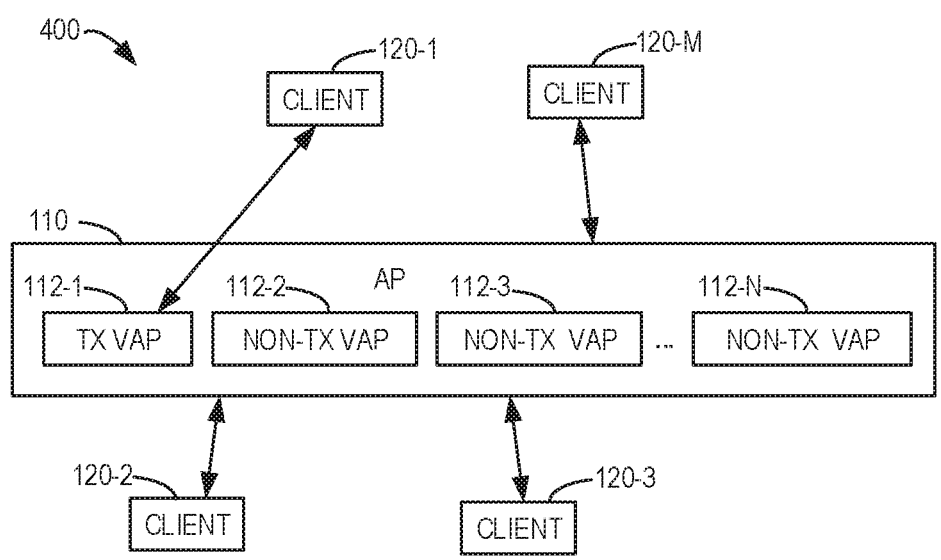
FIGS. 4A-4D illustrate some scenarios for which a transmitting VAP is selected from the set of VAPs in accordance with some example implementations of the present disclosure.

FIG. 4A shows a scenario 400 (e.g. in a hospital) for which a transmitting VAP 112-1 is selected from the set of VAPs 112 based on the respective importance levels of a set of clients 120 connecting to the set of VAPs 112, In FIG. 4A, it is assumed that the VAP 112-1 is connected to a client 120-1 of a set of clients 120. Other VAPs 112 are connected to other clients 120. The client 120-1 may be a device in a hospital, which has higher SLA requirements than other devices in the hospital. Thus, the VAP 112-1, to which the client 120-1 is connected, may be selected as the transmitting VAP.

By selecting the VAP connecting to a client with a relatively high SLA requirement as the transmitting VAP, it is possible to ensure the network connection for the important client. For example, if the configuration of the AP 110 needs to be changed, e.g. at the MAC layer, the change may be made to other VAPs 112, to ensure a stable connection between the client 120-1 and the transmitting VAP 112-1.

Although one client 120-1 connecting to the selected transmitting VAP 112-1 is illustrated, it is to be understood that this is only for the purpose of illustration without suggesting any limitations. There may be two or more clients 120 connecting to the VAP 112-1.

In some example implementations, the AP 110 may alternatively or additionally select a VAP 112 as a transmitting VAP based on context information indicating respective latency requirement levels of the set of clients 120 connecting to the set of VAPs 112. A latency requirement level of a client 120 may be determined from the respective latency requirement levels. The determined latency requirement level of the client 120 may be below a threshold latency level. Then, a VAP 112 to which the client 120 is connected may be selected as the transmitting VAP The respective latency requirement level herein may be referred to, for example, an acceptable latency time that a client requires to be responded by a VAP. A latency time may be milliseconds, seconds, etc. The threshold latency level may be pre-determined by a user, or may be learned through machine learning.

Figure 4B:
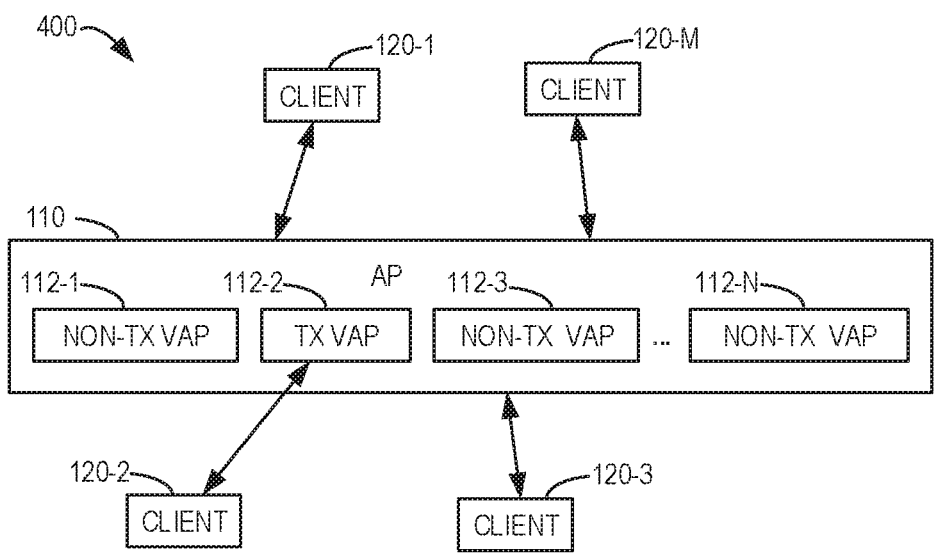

FIG. 4B shows a scenario 400 for which a transmitting VAP 112-2 is selected from the set of VAPs 112, based on context information indicating respective latency requirement levels of the set of clients 120 connecting to the set of VAPs 112. In FIG. 4B, the AP 110 is an EMA AP. A VAP 112-2 is connected to a client 120-2 of a set of clients 120. Other VAPs 112 are connected to other clients 120. The client 120-2 may be a latency sensitive device or a device to which the VAP 112-2 is about to transmit Broadcast/Multicast (BC/MC) traffic. In accordance with a determination that a latency requirement level of the client 120-2 is below a threshold latency level, the VAP 112-2 is selected as the transmitting VAP Other VAPs 112 including VAPs 112-1, 112-3 and 112-N are determined as non-transmitting VAPs.

Sometimes, all information of the set of VAPs 112 may not be able to fit into one beacon frame, in which case, multiple beacons may be used to advertise the information of the set of VAPs 112 by broadcasting the beacon frame multiple times. If there are many VAPs, some non-TX VAP may not be broadcasted each time. As mentioned above, the TX VAP is broadcasted each time the beacon frame is broadcast, but the non-TX VAP may not. The Delivery Traffic Indication Message (DTIM) interval for a non-TX VAP is multiple times of the DTIM interval for the TX VAP For a latency sensitive device, the data for it should be transmitted from a TX VAP such that it would not wait too long, since the data is transmitted after the DTIM interval for the TX VAP rather than after the DTI M interval for the non-TX VAP Therefore, the VAP 112-2 connecting to a latency sensitive client 120-2 should be selected as the TX VAP The BC/MC traffic needs to be sent during negotiated Broadcast Target Wake Time (BTWT) service period. Sometimes, the BC/MC traffic is very heavy. So, the data for the client 120-2 may need to be buffered in the AP 110 in advance. If the data is to be transmitted by a non-TX VAP since the DTIM interval for a non-TX VAP is much longer than that of the TX VAP, when it comes to the non-TX VAP's turn to transmit the data to the client 120-2, the data in the AP 110 may already be flushed. Therefore, the VAP 112-2 should be selected as the TX VAP, such that the data buffered in the AP 110 will be transmitted earlier to the client 120-2 which has heavy BC/MC traffic.

In this way, a latency sensitive client can be responded quickly because the speed of a transmitting VAP responding to the client is much shorter than that of a non-transmitting VAP Although one client 120-2 connecting to the selected transmitting VAP 112-2 is illustrated, it is to be understood that this is only for the purpose of illustration without suggesting any limitations. There may be two or more clients 120 connecting to the VAP 112-2.

In some example implementations, the AP 110 may alternatively or additionally select a VAP 112 as a transmitting VAP based on context information indicating a VAP communication requirement of at least one client 120, the VAP communication requirement indicating that the at least one client 120 requires to be served by a transmitting VAP A VAP 112 connected to such client 120 may be selected as the transmitting VAP.

Figure 4C:
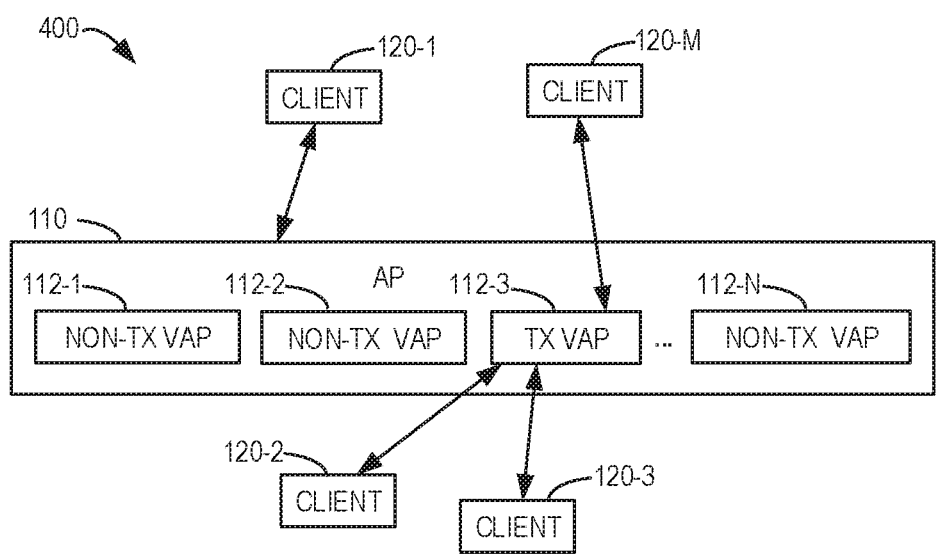

FIG. 4C shows a scenario 400 for which a transmitting VAP 112-3 is selected from the set of VAPs 112, based on context information indicating a VAP communication requirement of clients 120-2 and 120-3. For example, clients 120-2 and 120-3 do not support EMA functions, Such devices can detect a transmitting VAP, but may not operate with non-transmitting VAPs. Therefore, clients 120-2 and 120-3 require to be served by a transmitting VAP In another example, clients 120-2 and 120-3 are legacy clients (such as clients for 802.11ac), that do not support MBSSID functions. If they are assigned to a non-TX VAP they are unable to connect to the network. So, in a mixed deployment which provide service to legacy clients and clients for 802.11ax, the VAP assigned to legacy clients should be the TX-VAP In FIG. 40, the VAP 112-3 is connected to clients 120-2 and 120-3. Other VAPs 112 are connected to other clients 120. Thus, the VAP 112-3 connected to clients 120-2 and 120-3 is selected as the transmitting VAP Other VAPs 112 including VAPs 112-1, 112-2 and 112-N are determined as non-transmitting VAPs. In this way, all clients 120 can operate with the set of VAPs 112.

Although two clients 120-2 and 120-3 connecting to the selected transmitting VAP 112-3 are illustrated, it is to be understood that this is only for the purpose of illustration without suggesting any limitations. There may be less or more clients 120 connecting to the VAP 112-3.

In some example implementations, the AP 110 may select a VAP 112 as a transmitting VAP based on context information indicating a number of times of a client 120 switching from an AP 110 including the set of VAPs 112 to other APs within a time period. In accordance with a determination that the number of times exceeds a threshold number, a VAP 112 to which the client 120 is connected is selected as the transmitting VAP. The number of times of a client 120 switching between APs may be obtained from the cloud server or an access control (AC), for example. The threshold number may be pre-determined by a user, or may be learned through machine learning. The period time may be minutes, hours, days, weeks, etc.

Figure 4D:
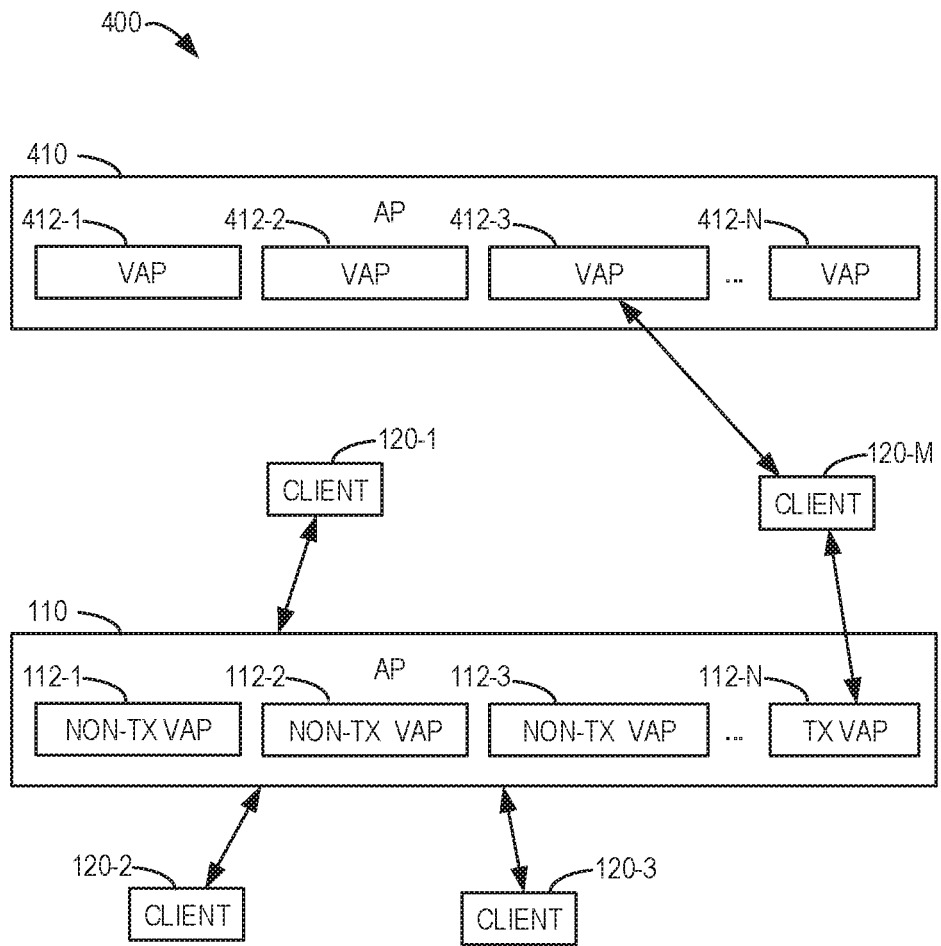

FIG. 4D shows a scenario 400 for which a transmitting VAP 112-N is selected from the set of VAPs 112, based on context information indicating a number of times of a client 120-M switching from an AP 110 to an AP 410 within a time period. The AP 410 includes VAP 412-1, VAP 412-2, VAP 412-3, . . . , and VAP 412-N, where N is an integer larger than one. The AP 410 has the same configuration with the AP 110. The client 120-M may be a mobile device that moves between a first and second floor of a building. The AP 110 may be located at the first floor, and the AP 410 may be located at the second floor, for example.

A VAP 112-N in the AP 110 and a VAP 412-3 in the AP 410 may both have same Service Set Identifiers (SSIDs), e.g. "Building WIFI", A SSI© may be considered as a name of an AP or VAP VAPs in the same AP have different names, and VAPs in different APs can have same names. As the client 120-M moves between the first and second floor, it switches between APs 110 and 410. During each switching, a user of the client 120-M may choose to connect the client 120-M to the VAP 112-N, since it has a common name "Building WIFI" with the VAP 412-3 in the AP 410. Thus, in accordance with a determination that the number of times that the client 120-M switches from/to the AP 110 to/from the AP 410 within a time period (e.g. one day) exceeds a threshold number, the VAP 112-N connected to the client 120-M is selected as the transmitting VAP of the set of VAPs 112. Other VAPs 112 including VAPs 112-1, 112-2 and 112-3 are determined as non-transmitting VAPs.

In this way, a client 120-M switching back to the set of APs 112 can be connected to the wireless communication network quickly, since the transmitting VAP can be detected by the client 120-M earlier than the non-transmitting VAPs do.

Although one client 120-M connecting to the selected transmitting VAP 112-N is illustrated, it is to be understood that this is only for the purpose of illustration without suggesting any limitations. There may be two or more clients 120 connecting to the VAP 112-N.

The context information described above may be utilized in any form of combination. It is to be understood that the context information described above are only examples. Those skilled in the art can think of utilizing other context information to select a VAP from a set of VAPs as a transmitting VAP.

Several example implementations have been described with respect to FIGS. 2-4D. In some example implementations, the example implementations may be combined. For example, any combination of the above-mentioned example context information may be utilized to select the transmitting VAP In some example implementations, respective weights may be assigned to different types of context information to weigh the impacts of the context information in selecting the transmitting VAP In some examples, the weights may be configured by an operator or administrator of the AR or may be automatically learned through machine learning.

Figure 5:
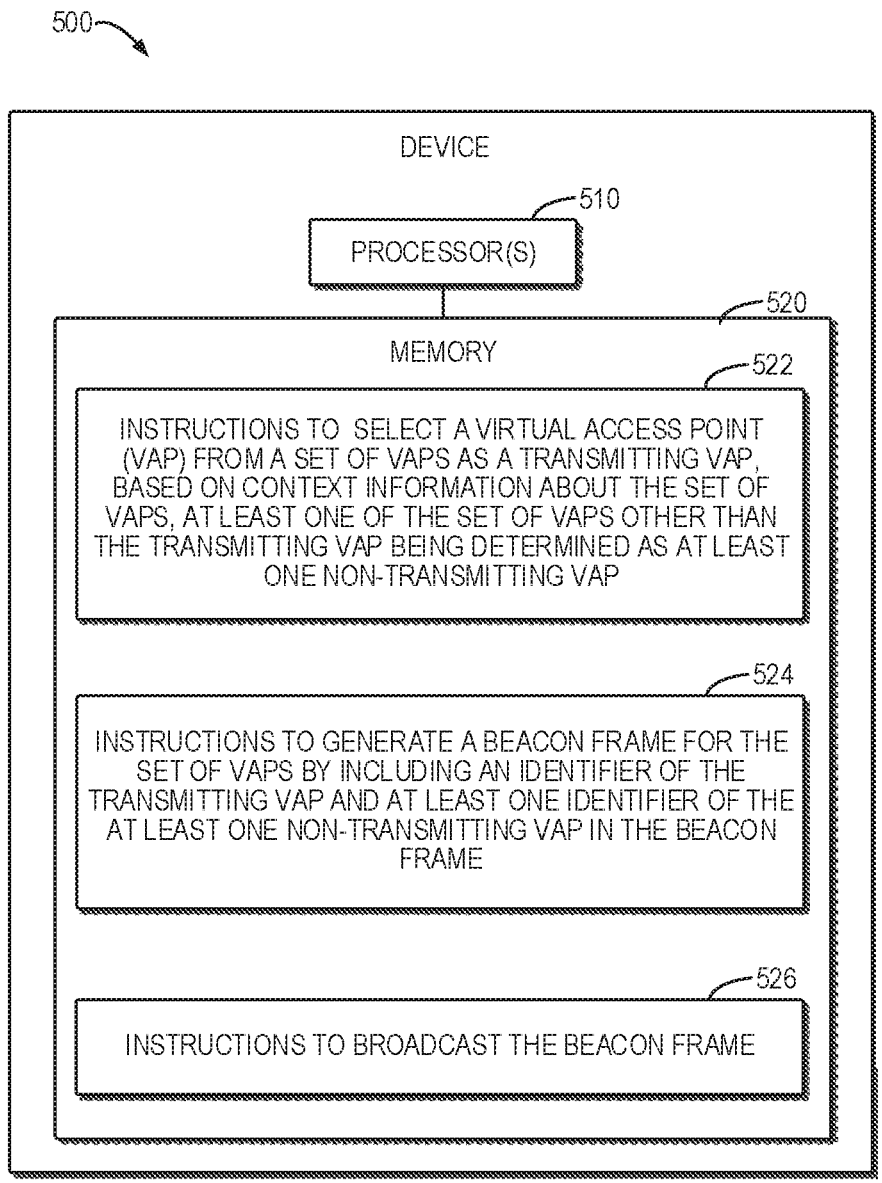
FIG. 5 illustrates a block diagram of a communication device in accordance with some example implementations of the present disclosure.

FIG. 5 illustrates a block diagram of an example device 500 in accordance with some example implementations of the present disclosure. The device 500 may be implemented as or included in the AP 110 in FIG. 1.

The device 500 comprises at least one processor 510 and a memory 520 coupled to the at least one processor 510. The memory 520 stores instructions to cause the at least one processor 510 to implement acts of a method according to some example implementations as described herein.

As illustrated in FIG. 5, the memory 520 stores instructions 522 to select a VAP from a set of VAPs as a transmitting VAP based on context information about the set of VAPs, and to determine at least one of the set of VAPs other than the transmitting VAP as at least one non-transmitting VAP In some example implementations, the instructions 522 to select a VAP from a set of VAPs as the transmitting VAP comprises instructions to select a VAP from the set of VAPs as the transmitting VAP based on at least one of the following: first context information indicating respective importance levels of a set of clients connecting to the set of VAPs, second context information indicating a size of the beacon frame to be generated, the size varying according to a selection of the transmitting VAP third context information indicating respective latency requirement levels of the set of clients connecting to the set of VAPs, fourth context information indicating a VAP communication requirement of at least one client, the VAP communication requirement indicating that the at least one client requires to be served by a transmitting VAP, or fifth context information indicating a number of times of a client switching from an access point (AP) including the set of VAPs to other APs within a time period.

In some example implementations, the instructions to select a VAP from the set of VAPs as the transmitting VAP based on the first context information comprises instructions to compare the respective importance levels of the set of clients with each other, and in accordance with a determination that an importance level of a client of the set of clients is higher than that of other clients of the set of clients, select a VAP to which the client is connected, as the transmitting VAP.

In some example implementations, the instructions to select a VAP from the set of VAPs as the transmitting VAP based on the second context information comprises instructions to select a VAP from the set of VAPs as the transmitting VAP such that the size of the beacon frame determined for the selected VAP is smaller than that of selecting other VAPs of the set of VAPs.

In some example implementations, the instructions to select a VAP from the set of VAPs as the transmitting VAP based on the third context information comprises instructions to determine, from the respective latency requirement levels, a latency requirement level of a client that is below a threshold latency level, and to select a VAP of the set of VAPs to which the client is connected, as the transmitting VAP In some example implementations, the instructions to select a VAP from the set of VAPs as the transmitting VAP based on the fourth context information comprises instructions to select a VAP of the set of VAPs to which the at least one client is connected, as the transmitting VAP.

In some example implementations, the instructions to select a VAP from the set of VAPs as the transmitting VAP based on the fifth context information comprises instructions to select a VAP of the set of VAPs to which the client is connected, as the transmitting VAP in accordance with a determination that the number of times exceeds a threshold number.

The memory 520 further stores instructions 524 to generate a beacon frame for the set of VAPs by including an identifier of the transmitting VAP and at least one identifier of the at least one non-transmitting VAP in the beacon frame. In some example implementations, the identifier of the transmitting VAP comprises a Basic Service Set Identifier (BSSID) of the transmitting VAP.

In some example implementations, including the at least one identifier of at least one non-transmitting VAP in the payload part of the beacon frame comprises: for a non-transmitting VAP of at least one non-transmitting VAP, determining at least one offset from the BSSID of the transmitting VAP and including the determined at least one offset into the payload part of the beacon frame as the at least one identifier of the non-transmitting VAP.

The present disclosure also provides at least one computer program product tangibly stored on a non-transitory computer-readable storage medium. The computer program product includes program codes or instructions which can be executed to carry out the method as described above with reference to FIG. 2.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   selecting a virtual access point (VAP) from a set of VAPs as a transmitting VAP based on first context information indicating respective importance levels of a set of clients connecting to the set of VAPs by comparing the respective importance levels of the set of clients with each other and in accordance with a determination that an importance level of a client of the set of clients is higher than that of other clients of the set of clients, selecting a VAP to which the client is connected, as the transmitting VAP, at least one of the set of VAPs other than the transmitting VAP being determined as at least one non-transmitting VAP;

generating a beacon frame for the set of VAPs by including an identifier of the transmitting VAP in a header part of the beacon frame and including at least one identifier of the at least one non-transmitting VAP in a payload part of the beacon frame; and broadcasting the beacon frame.

2. The method of claim 1, wherein the identifier of the transmitting VAP comprises a Basic Service Set Identifier (BSSID) of the transmitting VAP, and wherein including the at least one identifier of the at least one non-transmitting VAP in the payload part of the beacon frame comprises:

determining at least one offset from the BSSID of the transmitting VAP; and including the determined at least one offset into the payload part of the beacon frame as the at least one identifier of the non-transmitting VAP.

3. The method of claim 1, wherein selecting a VAP from the set of VAPs as the transmitting VAP comprises:

selecting a VAP from the set of VAPs as the transmitting VAP based on at least one of the following:

second context information indicating a size of the beacon frame to be generated, the size varying according to a selection of the transmitting VAP, third context information indicating respective latency requirement levels of the set of clients connecting to the set of VAPs, fourth context information indicating a VAP communication requirement of at least one client, the VAP communication requirement indicating that the at least one client requires to be served by a transmitting VAP, or fifth context information indicating a number of times of a client switching from an access point (AP) including the set of VAPs to other APs within a time period.

4. The method of claim 3, wherein selecting a VAP from the set of VAPs as the transmitting VAP based on the second context information comprises:

selecting a VAP from the set of VAPs as the transmitting VAP, such that the size of the beacon frame determined for the selected VAP is smaller than that of selecting other VAPs of the set of VAPs.

5. The method of claim 3, wherein selecting a VAP from the set of VAPs as the transmitting VAP based on the third context information comprises:

determining, from the respective latency requirement levels, a latency requirement level of a client that is below a threshold latency level; and selecting a VAP of the set of VAPs to which the client is connected, as the transmitting VAP.

6. The method of claim 3, wherein selecting a VAP from the set of VAPs as the transmitting VAP based on the fourth context information comprises:

selecting a VAP of the set of VAPs to which the at least one client is connected, as the transmitting VAP.

7. The method of claim 3, wherein selecting a VAP from the set of VAPs as the transmitting VAP based on the fifth context information comprises:

in accordance with a determination that the number of times exceeds a threshold number, selecting a VAP of the set of VAPs to which the client is connected, as the transmitting VAP.

8. A communication device comprising:

at least one processor; and a memory coupled to the at least one processor, the memory storing instructions to cause the at least one processor to perform acts comprising:

selecting a virtual access point (VAP) from a set of VAPs as a transmitting VAP, based on first context information indicating a size of the beacon frame to be generated by selecting a VAP from the set of VAPs as the transmitting VAP, such that the size of the beacon frame determined for the selected VAP is smaller than that of selecting other VAPs of the set of VAPs, at least one of the set of VAPs other than the transmitting VAP being determined as at least one non-transmitting VAP;

generating a beacon frame for the set of VAPs by including an identifier of the transmitting VAP and at least one identifier of the at least one non-transmitting VAP in the beacon frame; and broadcasting the beacon frame.

9. The communication device of claim 8, wherein generating the beacon frame comprises:

including the identifier of the transmitting VAP comprises a Basic Service Set Identifier (BSSID) of the transmitting VAP in a header part of the beacon frame.

10. The communication device of claim 9, wherein generating the beacon frame further comprises:

for a non-transmitting VAP of the at least one non-transmitting VAP, determining at least one offset from the BSSID of the transmitting VAP; and including the determined at least one offset into a payload part of the beacon frame as the at least one identifier of the non-transmitting VAP.

11. The communication device of claim 8, wherein selecting a VAP from the set of VAPs as the transmitting VAP comprises:

selecting a VAP from the set of VAPs as the transmitting VAP based on at least one of the following:

second context information indicating respective importance levels of a set of clients connecting to the set of VAPs, third context information indicating respective latency requirement level of the set of clients connecting to the set of VAPs, fourth context information indicating a VAP communication requirement of at least one client, the VAP communication requirement indicating that the at least one client requires to be served by a transmitting VAP, or fifth context information indicating a number of times of a client switching from an access point (AP) including the set of VAPs to other APs within a time period.

12. The communication device of claim 11, wherein selecting a VAP from the set of VAPs as the transmitting VAP based on the second context information comprises:

comparing the respective importance levels of the set of clients with each other; and in accordance with a determination that an importance level of a client of the set of clients is higher than that of other clients of the set of clients, selecting a VAP to which the client is connected, as the transmitting VAP.

13. The communication device of claim 11, wherein selecting a VAP from the set of VAPs as the transmitting VAP based on the third context information comprises:
- determining, from the respective latency requirement levels, a latency requirement level of a client that is below a threshold latency level; and
- selecting a VAP of the set of VAPs to which the client is connected, as the transmitting VAP.

14. The communication device of claim 11, wherein selecting a VAP from the set of VAPs as the transmitting VAP based on the fourth context information comprises:
- selecting a VAP of the set of VAPs to which the at least one client is connected, as the transmitting VAP.

15. The communication device of claim 11, wherein selecting a VAP from the set of VAPs as the transmitting VAP based on the fifth context information comprises:
- in accordance with a determination that the number of times exceeds a threshold number, selecting a VAP of the set of VAPs to which the client is connected, as the transmitting VAP.

16. A non-transitory computer-readable medium comprising instructions stored thereon which, when executed by an apparatus, cause the apparatus to:
- select a virtual access point (VAP) from a set of VAPs as a transmitting VAP, based on first context information indicating respective latency requirement levels of the set of clients connecting to the set of VAPs by determining, from the respective latency requirement levels, a latency requirement level of a client that is below a threshold latency level and selecting a VAP of the set of VAPs to which the client is connected, as the transmitting VAP;
- determine at least one of the set of VAPs other than the transmitting VAP as at least one non-transmitting VAP;
- generate a beacon frame for the set of VAPs by including an identifier of the transmitting VAP in a header part of the beacon frame and including at least one identifier of the at least one non-transmitting VAP in a payload part of the beacon frame; and
- broadcast the beacon frame.

17. The non-transitory computer-readable medium of claim 16, wherein the identifier of the transmitting VAP comprises a Basic Service Set Identifier (BSSID) of the transmitting VAP,
- wherein including the at least one identifier of the at least one non-transmitting VAP in the payload part of the beacon frame comprises:
- for a non-transmitting VAP of the at least one non-transmitting VAP,
  - determining at least one offset from the BSSID of the transmitting VAP; and
  - including the determined at least one offset into the payload part of the beacon frame as the at least one identifier of the non-transmitting VAP.

18. The non-transitory computer-readable medium of claim 16, wherein the instructions causing the apparatus to select a VAP from the set of VAPs as the transmitting VAP comprise instructions causing the apparatus to:
- select a VAP from the set of VAPs as the transmitting VAP based on at least one of the following:
  - second context information indicating respective importance levels of a set of clients connecting to the set of VAPs,
  - third context information indicating a size of the beacon frame to be generated, the size varying according to a selection of the transmitting VAP,
  - fourth context information indicating a VAP communication requirement of at least one client, the VAP communication requirement indicating that the at least one client requires to be served by a transmitting VAP, or
  - fifth context information indicating a number of times of a client switching from an access point (AP) including the set of VAPs to other APs within a time period.

* * * * *